US012646879B2

(12) United States Patent
Yamada et al.

(10) Patent No.: US 12,646,879 B2
(45) Date of Patent: Jun. 2, 2026

(54) TERMINAL UNIT, FEMALE TERMINAL AND MALE TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Yamada, Mie (JP); Katsuhiko Aizawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 374 days.

(21) Appl. No.: 18/277,891

(22) PCT Filed: Feb. 18, 2022

(86) PCT No.: PCT/JP2022/006649
§ 371 (c)(1),
(2) Date: Aug. 18, 2023

(87) PCT Pub. No.: WO2022/185954
PCT Pub. Date: Sep. 9, 2022

(65) Prior Publication Data
US 2024/0313454 A1 Sep. 19, 2024

(30) Foreign Application Priority Data
Mar. 4, 2021 (JP) ................................ 2021-034511

(51) Int. Cl.
*H01R 13/11* (2006.01)
*H01R 13/04* (2006.01)

(52) U.S. Cl.
CPC ............ *H01R 13/11* (2013.01); *H01R 13/04* (2013.01)

(58) Field of Classification Search
CPC .............................. H01R 13/04; H01R 13/055
See application file for complete search history.

(56) References Cited

U.S. PATENT DOCUMENTS 6,068,526 A * 5/2000 Nottrott ................ H01R 13/18 439/845
6,293,832 B1 9/2001 Yamamoto
(Continued)

FOREIGN PATENT DOCUMENTS

JP H05-087837 U1 11/1993
JP 2009-277436 A 11/2009
(Continued)

OTHER PUBLICATIONS

International Search Report issued on Apr. 19, 2022 for WO 2022/185954 A1 (5 pages).

*Primary Examiner* — Ross N Gushi
(74) *Attorney, Agent, or Firm* — Venjuris, P.C.

(57) ABSTRACT

In a terminal unit a female terminal includes a first wall portion and a second wall portion arranged to face each other across a male terminal insertion gap, into which a male terminal is inserted and arranged. The male terminal includes a pair of inclined portions, inclined toward one side in a plate thickness direction of the male terminal on both sides in a plate width direction. The first wall portion includes a resilient contact portion 40 facing a surface of the male terminal on the one side in the plate thickness direction and projecting toward the second wall portion. The resilient contact portion is resiliently deformable in a direction sepa- (Continued)

rating from the second wall portion to bias the male terminal toward the second wall portion.

7 Claims, 3 Drawing Sheets

(56) References Cited

U.S. PATENT DOCUMENTS

| | | | | |
|---|---|---|---|---|
| 7,448,873 | B2 * | 11/2008 | Weber | H01R 12/722 439/31 |
| 2017/0033487 | A1 | 2/2017 | Onuma et al. | |
| 2019/0157786 | A1 | 5/2019 | Horiuchi | |

FOREIGN PATENT DOCUMENTS

| | | | |
|---|---|---|---|
| JP | 2014-078355 | A | 5/2014 |
| JP | 2017-204396 | A | 11/2017 |

* cited by examiner

TERMINAL UNIT, FEMALE TERMINAL AND MALE TERMINAL

CROSS REFERENCE TO RELATED APPLICATIONS

This application is a national phase of PCT application No. PCT/JP2022/006649, filed on 18 Feb. 2022, which claims priority from Japanese patent application No. 2021-034511, filed on 4 Mar. 2021, all of which are incorporated herein by reference.

TECHNICAL FIELD

The present disclosure relates to a terminal unit and a female terminal and a male terminal used for this terminal unit.

BACKGROUND

Patent Document 1 discloses a terminal unit composed of a male terminal having a plate-like shape expressed as a tab-like shape and a female terminal to be connected to the male terminal. The female terminal includes a pair of wall portions arranged to face each other across a male terminal insertion gap, one wall portion is provided with a resilient contact piece for pressing the male terminal against the other wall portion and a plurality of contact points are provided to project on the other wall portion.

PRIOR ART DOCUMENT

Patent Document

Patent Document 1: JP 2017-204396 A

SUMMARY OF THE INVENTION

Problems to be Solved

Since the terminal unit of Patent Document 1 is structured to sandwich the flat plate-like male terminal by the pair of wall portions of the female terminal, a gripping force against an external force acting in a plate width direction of the male terminal is small. Thus, a further improvement has been required since an increase of a contact resistance value is also conceivable due to fine sliding friction between the male and female terminals caused by vibration or the like.

Accordingly, a terminal unit capable of suppressing a displacement of a male terminal in a plate width direction with respect to a female terminal and a female terminal and a male terminal used for the terminal unit are disclosed.

Means to Solve the Problem

A terminal unit of the present disclosure is provided with a plate-like male terminal and a female terminal to be connected to the male terminal, the female terminal including a first wall portion and a second wall portion arranged to face each other across a male terminal insertion gap, the male terminal being inserted into and arranged in the male terminal insertion gap, the male terminal including a pair of inclined portions on both sides in a plate width direction, the plate width direction being a direction intersecting an inserting direction into the male terminal insertion gap, the pair of inclined portions being inclined toward one side in a plate thickness direction of the male terminal, the first wall portion including a resilient contact portion facing a surface of the male terminal on the one side in the plate thickness direction and projecting toward the second wall portion, the resilient contact portion being resiliently deformable in a direction separating from the second wall portion to bias the male terminal toward the second wall portion, and the second wall portion including a pair of first projecting contact point portions facing a surface of the male terminal on the other side in the plate thickness direction, the pair of first projecting contact point portions respectively contacting the pair of inclined portions of the male terminal.

A female terminal of the present disclosure is a female terminal used in the terminal unit of the present disclosure.

A male terminal of the present disclosure is a male terminal used in the terminal unit of the present disclosure.

Effect of the Invention

According to the present disclosure, it is possible to provide a terminal unit capable of suppressing a displacement of a male terminal in a plate width direction with respect to a female terminal and a female terminal and a male terminal used for the terminal unit.

DETAILED DESCRIPTION TO EXECUTE THE INVENTION

Description of Embodiments of Present Disclosure

Figure 1:
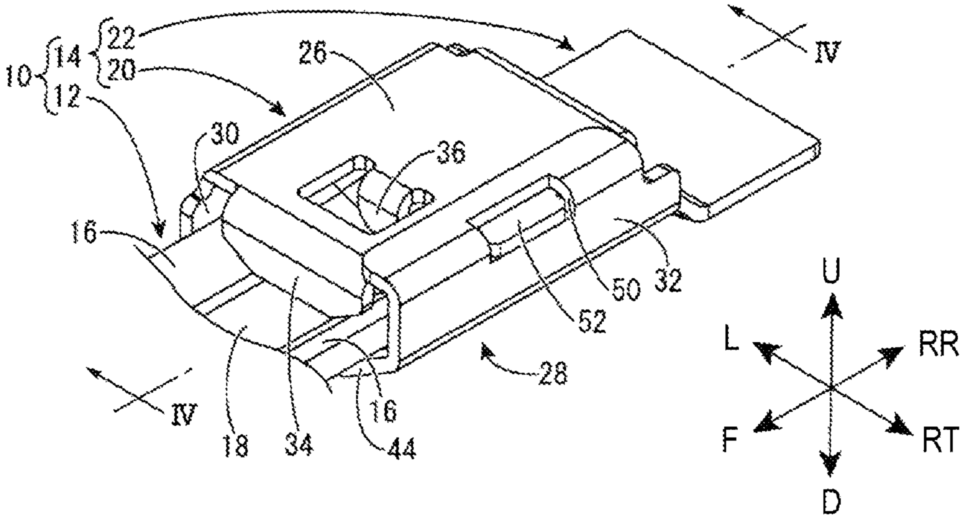
FIG. 1 is an overall perspective view showing a terminal unit according to one embodiment.

First, embodiments of the present disclosure are listed and described.

(1) The terminal unit of the present disclosure is provided with a plate-like male terminal and a female terminal to be connected to the male terminal, the female terminal including a first wall portion and a second wall portion arranged to face each other across a male terminal insertion gap, the male terminal being inserted into and arranged in the male terminal insertion gap, the male terminal including a pair of inclined portions on both sides in a plate width direction, the plate width direction being a direction intersecting an inserting direction into the male terminal insertion gap, the pair of inclined portions being inclined toward one side in a plate thickness direction of the male terminal, the first wall portion including a resilient contact portion facing a surface of the male terminal on the one side in the plate thickness direction and projecting toward the second wall portion, the resilient contact portion being resiliently deformable in a direction separating from the second wall portion to bias the male terminal toward the second wall portion, and the second wall portion including a pair of first projecting contact point portions facing a surface of the male terminal on the other side in the plate thickness direction, the pair of first projecting contact point portions respectively contacting the pair of inclined portions of the male terminal.

According to the terminal unit of the present disclosure, the female terminal includes the first and second wall portions arranged to face each other across the male terminal insertion gap, and the male terminal is biased toward the second wall portion by the resilient contact portion provided on the first wall portion. The male terminal includes the pair of inclined portions inclined toward the one side in the plate thickness direction of the male terminal on the both sides in the plate width direction of the male terminal. The female terminal includes, on the second wall portion, the pair of first projecting contact point portions to be respectively brought into contact with the pair of inclined portions of the male terminal. Thus, if the male terminal inserted into the male terminal insertion gap is pressed toward the second wall portion by the resilient contact portion of the female terminal, the inclined portions of the male terminal are pressed against the first projecting contact point portions of the female terminal on the both sides in the plate width direction of the male terminal, and component forces acting inward in the plate width direction are generated. As a result, a force for preventing a displacement of the male terminal can be increased against an external force acting in the plate width direction of the male terminal and a displacement of the male terminal in the plate width direction with respect to the female terminal can be suppressed as compared to conventional structures. Thus, it is possible to suppress fine sliding friction between the male and female terminals due to vibration or the like and an increase of a contact resistance value caused by the fine sliding friction.

(2) Preferably, the second wall portion of the female terminal includes a pair of side edge parts, the pair of first projecting contact point portions projecting on the first side edge parts, and the pair of side edge parts are bent toward the first wall portion. In the second wall portion of the female terminal, the pair of side edge parts provided with the pair of first projecting contact point portions are bent toward the first wall portion. Reaction forces from the pair of first projecting contact point portions respectively in contact with the pair of inclined portions of the male terminal and generated in directions perpendicular to the pair of side edge parts can be caused to act inward in the plate width direction of the male terminal on the both sides in the plate width direction of the male terminal. In this way, a force for preventing a displacement of the male terminal can be increased against an external force acting in the plate width direction of the male terminal, more advantageously utilizing the reaction forces from the first projecting contact point portions. Therefore, a displacement of the male terminal in the plate width direction with respect to the female terminal can be suppressed.

(3) Preferably, the male terminal includes a flat portion arranged between the pair of inclined portions in the plate width direction, and the resilient contact portion of the female terminal includes a second projecting contact point portion to be brought into contact with the flat portion of the male terminal. The second projecting contact point portion of the female terminal is pressed against the flat portion of the male terminal from the one side in the plate thickness direction of the male terminal, and the first projecting contact point portions of the female terminal are pressed against the pair of inclined portions of the male terminal from the other side in the plate thickness direction of the male terminal. In this way, the male terminal can be more stably held by three contact point portions of the female terminal and a contact resistance can be reduced.

(4) Preferably, the male terminal includes a flat portion arranged between the pair of inclined portions in the plate width direction and an angle of inclination of the pair of inclined portions with respect to the flat portion is θ1, the second wall portion of the female terminal includes a flat plate portion arranged between the pair of side edge parts in the plate width direction and an angle of inclination of the pair of side edge parts with respect to the flat plate portion is θ2, and the angle of inclination θ1 is equal to the angle of inclination θ2 or different therefrom within a range of 10°. The male terminal and the second wall portion of the female terminal have corresponding shapes, and the angle of inclination θ1 of the pair of inclined portions with respect to the flat portion is set equal to the angle of inclination θ2 of the pair of side edge parts with respect to the flat plate portion or different therefrom within the range of 10°. In this way, a force for preventing a displacement of the male terminal can be increased against an external force acting in the plate width direction of the male terminal while the terminal unit is reduced in size.

(5) Preferably, each first projecting contact point portion continuously extends in the inserting direction of the male terminal into the male terminal insertion gap. Since the first projecting contact point portions continuously extend in the inserting direction of the male terminal, a contact area between the male and female terminals can be stably secured and a contact pressure between the both terminals can also be reduced.

(6) The female terminal of the present disclosure is the female terminal used in the terminal unit of any one of (1) to (5) described above. Since being used in the terminal unit of any one of (1) to (5) described above, the female terminal of the present disclosure can similarly have functions and effects enjoyable by the terminal units of (1) to (5) described above. Therefore, it is possible to suppress a displacement of the male terminal in the plate width direction with respect to the female terminal and suppress fine sliding friction between the male and female terminals due to vibration or the like and an increase of a contact resistance value caused by the fine sliding friction.

(7) The male terminal of the present disclosure is the male terminal used in the terminal unit of any one of (1) to (5) described above. Since being used in the terminal unit of any one of (1) to (5) described above, the male terminal of the present disclosure can similarly have functions and effects enjoyable by the terminal units of (1) to (5) described above. Therefore, it is possible to suppress a displacement of the male terminal in the plate width direction with respect to the female terminal and suppress fine sliding friction between the male and female terminals due to vibration or the like and an increase of a contact resistance value caused by the fine sliding friction.

Details of Embodiment of Present Disclosure

Specific examples of a terminal module of the present disclosure and a female terminal and a male terminal used for the terminal unit are described below with reference to the drawings. Note that the present disclosure is not limited to these illustrations, but is represented by claims and intended to include all changes in the scope of claims and in the meaning and scope of equivalents.

Embodiment

A terminal unit 10 of one embodiment of the present disclosure is described below using FIGS. 1 to 5. The terminal unit 10 is provided with a male terminal 12 and a female terminal 14. The male terminal 12 and the female terminal 14 are electrically connected by inserting the male terminal 12 into the female terminal 14 and bringing these terminals into contact. Note that although the terminal unit 10 can be arranged in an arbitrary orientation, a vertical direction, a lateral direction and a front-rear direction are based on a vertical direction, a lateral direction and a front-rear direction shown in figures in the following description. Further, for a plurality of identical members, only some members may be denoted by a reference sign and the other members may not be denoted by the reference sign.

<Male Terminal 12>

The male terminal 12 has a plate-like shape as a whole, and is formed using an unillustrated flat plate fitting. The flat plate fitting has a rectangular shape. The male terminal 12 has predetermined plate width (lateral dimension in FIG. 5) and plate thickness (vertical dimension in FIG. 5) and extends straight. Note that, in the male terminal 12, an end part on a tip side (rear side in FIG. 4) in an inserting direction has a tapered shape. The male terminal 12 is electrically conductive and, for example, formed of metal having a low electrical resistance such as copper, copper alloy, aluminum or aluminum alloy.

By bending and inclining both end parts in the plate width direction of the flat plate fitting toward one side (upper side) in the plate thickness direction, a pair of inclined portions 16, 16 are provided on both end parts in the plate width direction of the male terminal 12. That is, in the male terminal 12, the pair of inclined portions 16, 16 are provided on both sides in a direction intersecting an inserting direction into a male terminal insertion gap 38 to be described later, i.e. in the plate width direction orthogonal to the inserting direction in this embodiment. An intermediate part in the plate width direction located between the pair of inclined portions 16, 16 in the plate width direction of the male terminal 12 is provided with a flatly extending flat portion 18. An angle of inclination of the pair of inclined portions 16, 16 with respect to the flat portion 18 is θ1 (see FIG. 5).

The angle of inclination θ1 of the pair of inclined portions 16, 16 with respect to the flat portion 18 is not limited, but is preferably 5° or more and 45° or small, more preferably 10° or more and 30° or less. By setting the angle of inclination θ1 of the inclined portions 16 to 5° or more, a component force can be effectively made to act inward in the plate width direction when an external force acting outward in the plate width direction is input to the male terminal 12, and an outward displacement of the male terminal 12 in the plate width direction can be suppressed. By setting the angle of inclination θ1 of the inclined portions 16 to 45° or less, a vertical dimension of the male terminal 12, consequently the terminal unit 10, can be suppressed to be small.

As described later, with the male terminal 12 inserted in the male terminal insertion gap 38 of the female terminal 14, one surface (upper surface) of the male terminal 12 in the plate thickness direction is facing a first wall portion 26 of the female terminal 14. Further, the other surface (lower surface) in the plate thickness direction is facing a second wall portion 28 of the female terminal 14. The lower surfaces of the inclined portions 16, 16 contact first projecting contact point portions 46 provided on the second wall portion 28, and the upper surface of the flat portion 18 contacts a second projecting contact point portion 42 of a resilient contact portion 40 provided on the first wall portion 26.

In the male terminal 12, an unillustrated flat plate portion extending straight is provided on a side closer to a base end in the inserting direction than a formation region of the inclined portions 16, 16. The flat plate portion is, for example, provided with a bolt insertion hole, and is fixed to a terminal portion of a device or a wire.

<Female Terminal 14>

Figure 2:
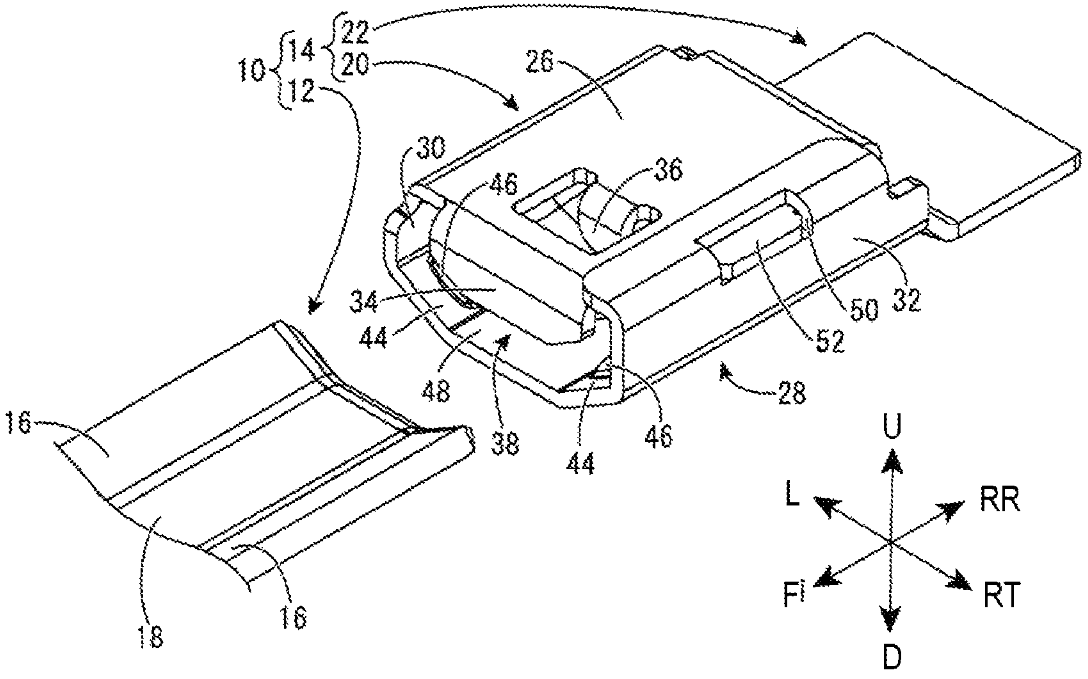
FIG. 2 is an exploded perspective view of FIG. 1.
Figure 4:
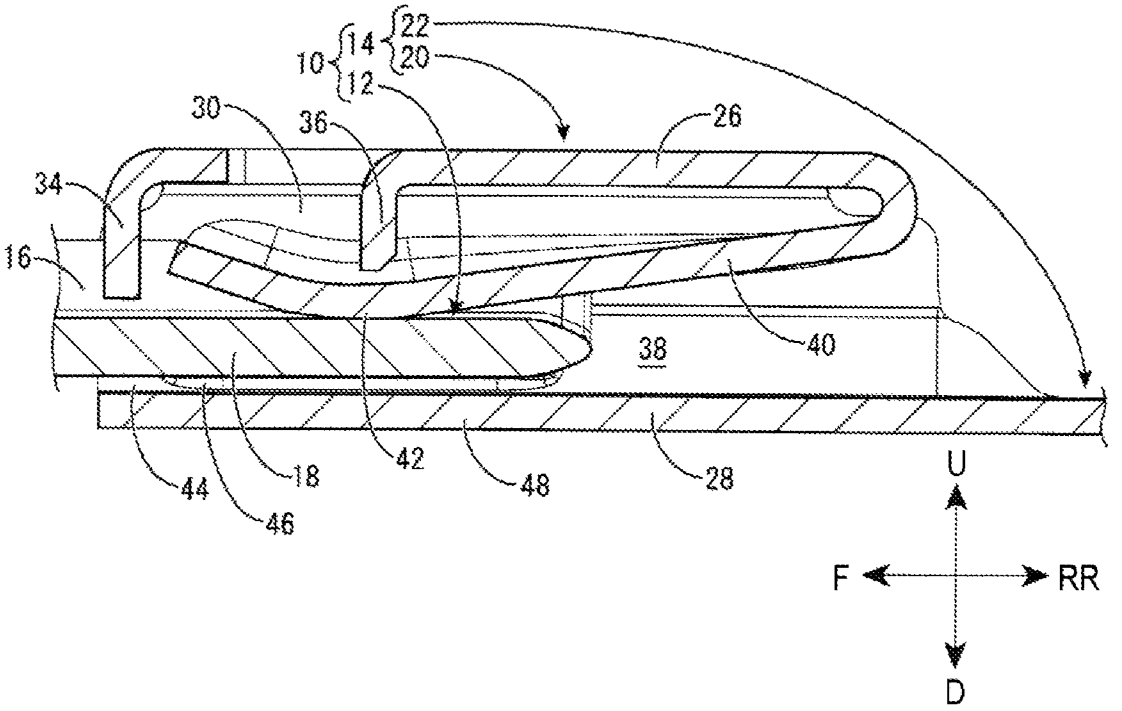
FIG. 4 is an enlarged section along IV-IV in FIG. 1.

For example, as shown in FIGS. 2 and 4, the female terminal 14 is integrally configured to include a box-shaped body portion 20 having the male terminal insertion gap 38 open in the front-rear direction inside and a wire connecting portion 22 to be fixed to a core wire of an unillustrated wire. More particularly, the female terminal 14 is electrically conductive and formed using one of various materials such as brass, copper, copper alloy, aluminum and aluminum alloy, which can be press-worked or punched.

<Body Portion 20>

The body portion 20 is substantially in the form of a box and includes the first and second wall portions 26, 28 facing each other in the vertical direction, and a pair of side walls 30, 32 facing each other in the lateral direction. In addition, the body portion 20 includes a protection wall 34 for covering a projecting tip part of the resilient contact portion 40 to be described later from front and a prevention wall 36 for preventing an upward excessive displacement of the resilient contact portion 40.

The resilient contact portion 40 in the form of a tongue piece is provided to extend on the rear end of the first wall portion 26 located on an upper side, and formed by being folded inwardly of the body portion 20 from the rear end of the first wall portion 26 as shown in FIG. 4. A tip part of the resilient contact portion 40 is bent upward after the resilient contact portion 40 extends straight in an oblique direction toward a front side and an axial center from the rear end of the first wall portion 26. As a result, the resilient contact portion 40 includes the second projecting contact point portion 42 to be brought into contact with the flat portion 18 of the male terminal 12 (see FIGS. 4 and 5). A tip part of the male terminal 12 is insertable into a gap between the resilient contact portion 40 and the second wall portion 28. That is, the resilient contact portion 40 is cantilevered with a rear end side held on the first wall portion 26, and projects while gradually approaching the second wall portion 28 toward the front side. By inserting the male terminal 12 between the resilient contact portion 40 and the second wall portion 28, the resilient contact portion 40 is resiliently deformable in a direction separating from the second wall portion 28. As a result, the resilient contact portion 40 biases the male terminal 12 toward the second wall portion 28.

The protection wall 34 in the form of a rectangular flat plate projecting toward the second wall portion 28 while having a width smaller than a separation distance between the pair of side walls 30 and 32 is provided on the front end of the first wall portion 26 located on the upper side. The tip part of the male terminal 12 is insertable through a gap between a projecting tip part of the protection wall 34 and the second wall portion 28. As shown in FIG. 4, the protection wall 34 is configured to cover the projecting tip part of the resilient contact portion 40 from front. In this way, the resilient contact portion 40 is protected from abnormal deformation caused by the contact of the tip part of the male terminal 12 with the projecting tip part of the resilient contact portion 40.

The prevention wall 36 in the form of a rectangular flat plate cantilevered toward the second wall portion 28 by being cut at three sides by a slit is provided in a laterally central part of a front side of the first wall portion 26 located on the upper side. A projecting dimension of the prevention wall 36 is smaller than that of the protection wall 34. The resilient contact portion 40 comes into contact with a projecting tip part of the prevention wall 36, thereby being prevented from being excessively deformed toward the first wall portion 26 by the male terminal 12.

The second wall portion 28 located on a lower side includes a pair of side edge parts 44, 44 on both end parts in a plate width direction (lateral direction in figures) along the plate width direction of the male terminal 12. A pair of the first projecting contact point portions 46 are provided to project on the pair of side edge parts 44, 44. The pair of side edge parts 44, 44 are bent toward the first wall portion 26 located on the upper side. Further, the flatly extending flat plate portion 48 is provided in an intermediate part in the plate width direction located between the pair of side edge parts 44, 44 in the plate width direction of the second wall portion 28 of the female terminal 14. An angle of inclination of the pair of side edge parts 44, 44 with respect to the flat plate portion 48 is θ2 (see FIG. 5). Here, θ2 is equal to θ1 or different therefrom within a range of 10°.

Figure 3:
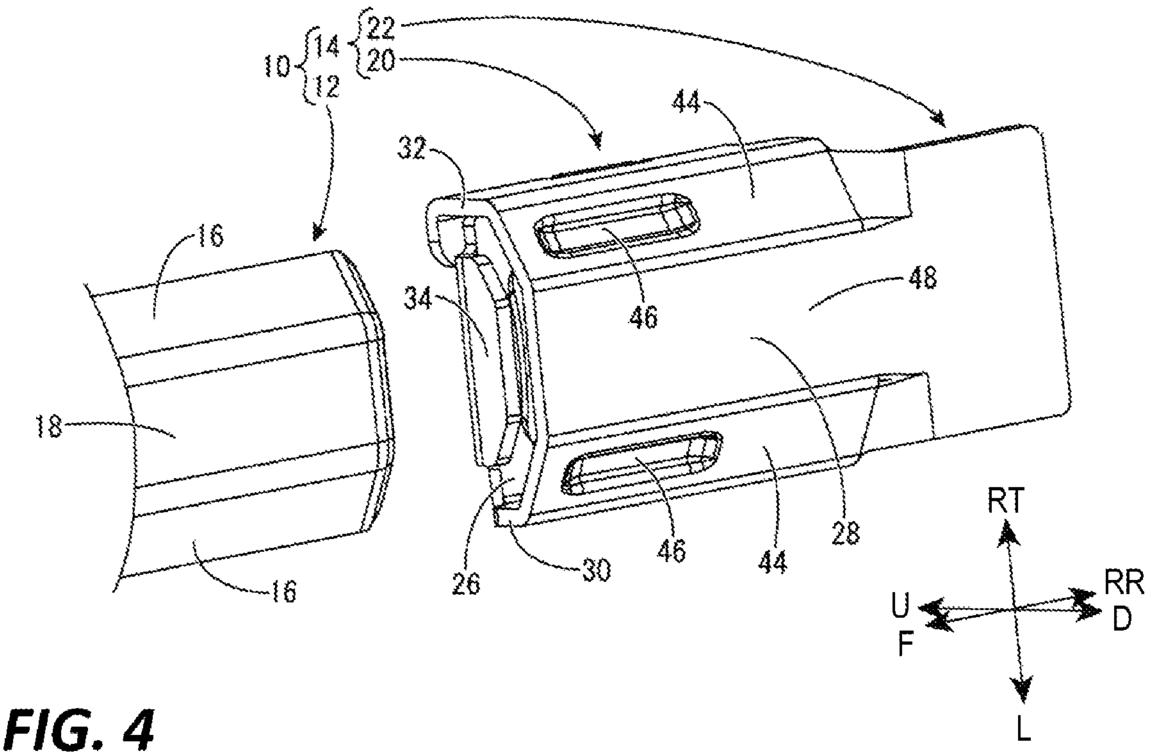
FIG. 3 is a perspective view of FIG. 2 when viewed from another direction.
Figure 5:
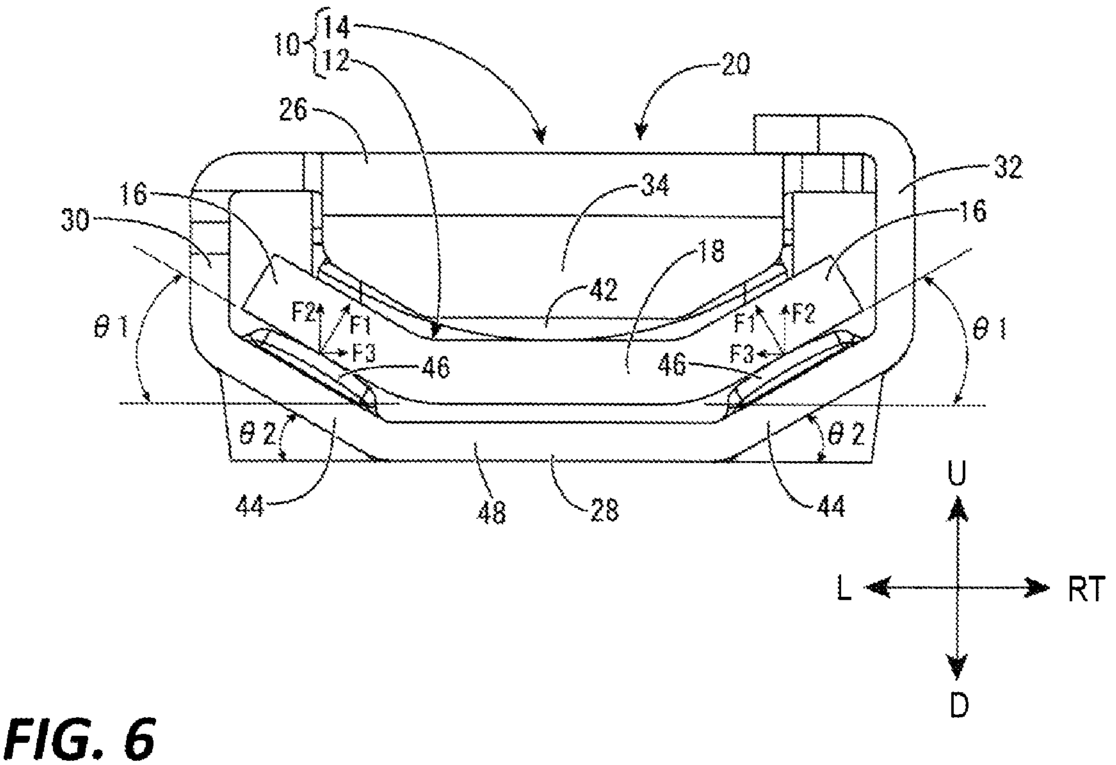
FIG. 5 is an enlarged front view of FIG. 1.

As a result, the pair of side edge parts 44, 44 of the second wall portion 28 include the pair of first projecting contact point portions 46, 46 to be respectively brought into contact with the lower surfaces of the pair of inclined portions 16, 16 of the male terminal 12 as shown in FIG. 5. Further, as shown in FIG. 3, the respective first projecting contact point portions 46 continuously extend in the front-rear direction, which is the inserting direction of the male terminal 12 into the male terminal insertion gap 38, on front sides of the pair of side edge parts 44, 44 of the second wall portion 28.

The female terminal 14 having such a structure can be manufactured by the following method. For example, a metal flat plate is bent after being pressed and punched, whereby the resilient contact portion 40, the protection wall 34 and the prevention wall 36 are formed. Subsequently, the both side walls 30, 32 are bent from the second wall portion 28 serving as a bottom plate to face each other, and further the first wall portion 26 serving as a ceiling plate continuous from the side wall 30 is bent to face the second wall portion 28, whereby the box-shaped body portion 20 open on both front and rear sides is assembled.

As shown in FIG. 1, an engaging hole 50 is provided to penetrate through a side edge part of the side wall 32, and a locking portion 52 to be fit into the engaging hole 50 is provided to project on a side edge part of the first wall portion 26. After the locking portion 52 is fit into the engaging hole 50, the side edge part of the side wall 32 is bent until coming into contact with the first wall portion 26, whereby the side wall 32 and the first wall portion 26 are engaged and fixed. In this state, the resilient contact portion 40 folded inwardly from the rear end of the first wall portion 26 is arranged in the body portion 20. Finally, the core wire of the unillustrated wire is fixed to the wire connecting portion 22.

According to the terminal unit 10 of the present disclosure structured as just described, the female terminal 14 includes the first and second wall portions 26, 28 arranged to face each other across the male terminal insertion gap 38. The male terminal 12 is biased toward the second wall portion 28 by the resilient contact portion 40 provided on the first wall portion 26. The male terminal 12 includes the pair of inclined portions 16, 16 inclined upward in the plate thickness direction of the male terminal 12 on the both sides in the plate width direction of the male terminal 12. The female terminal 14 includes, on the second wall portion 28, the pair of first projecting contact point portions 46, 46 to be respectively brought into contact with the pair of inclined portions 16, 16 of the male terminal 12. In this way, if an external force acting in the plate width direction is input to the male terminal 12 with the male terminal 12 inserted in the female terminal 14, that external force is applied to the female terminal 14 through the male terminal 12. As a result, reaction forces to the external force are generated in directions of arrows F1 in FIG. 5 from the first projecting contact point portions 46, 46 of the female terminal 14 to the inclined portions 16, 16 of the male terminal 12. By these reaction forces F1, upward component forces F2 and laterally inward component forces F3 are generated. That is, even if the external force acting in the plate width direction is input to the male terminal 12, the laterally inward component forces F3 are generated by the first projecting contact point portions 46, 46 and the inclined portions 16, 16 and a displacement of the male terminal 12 in the plate width direction is suppressed. Therefore, it is possible to suppress fine sliding friction between the female terminal 14 and the male terminal 12 due to vibration on a vehicle or the like and an increase of a contact resistance value caused by the fine sliding friction.

In the second wall portion 28 of the female terminal 14, the pair of side edge parts 44, 44 provided with the pair of first projecting contact point portions 46, 46 are bent toward the first wall portion 26 of the female terminal 14. In this way, reaction forces (F1) from the pair of first projecting contact point portions 46, 46 respectively in contact with the pair of inclined portions 16, 16 of the male terminal 12 and generated in directions perpendicular to the pair of side edge parts 44, 44 can be caused to act inward in the plate width direction of the male terminal 12 on the both sides in the plate width direction of the male terminal 12. Thus, a force for preventing a displacement of the male terminal 12 can be increased against an external force acting outward in the plate width direction of the male terminal 12, more advantageously utilizing the reaction forces from the first projecting contact point portions 46. Therefore, a displacement of the male terminal 12 in the plate width direction with respect to the female terminal 14 can be suppressed.

The second projecting contact point portion 42 of the female terminal 14 is pressed against the flat portion 18 of the male terminal 12 from above in the plate thickness direction of the male terminal 12, and the first projecting contact point portions 46, 46 of the female terminal 14 are pressed against the pair of inclined portions 16, 16 of the male terminal 12 from below in the plate thickness direction of the male terminal 12. In this way, the male terminal 12 can be stably held by three contact point portions 42, 46 and 46 of the female terminal 14 and a contact resistance can be reduced. Further, the male terminal 12 and the second wall portion 28 of the female terminal 14 have corresponding shapes, and the angle of inclination θ1 of the pair of inclined portions 16, 16 with respect to the flat portion 18 is set equal to the angle of inclination θ2 of the pair of side edge parts 44, 44 with respect to the flat plate portion 48 or different therefrom within the range of 10°. In this way, forces (F3) for preventing a displacement of the male terminal 12 can be increased against an external force acting outward in the plate width direction of the male terminal 12 while the terminal unit 10 is reduced in size. Further, since the first projecting contact point portions 46 continuously extend in the inserting direction of the male terminal 12, a contact area between the female terminal 14 and the male terminal 12 can be stably secured and a contact pressure between the both terminals 14 and 12 can also be reduced.

The female terminal 14 of the present disclosure structured as just described can similarly have functions and effects enjoyable by the aforementioned terminal unit 10. Thus, a displacement of the male terminal 12 in the plate width direction with respect to the female terminal 14 can be suppressed, and fine sliding friction between the female terminal 14 and the male terminal 12 due to vibration or the like and an increase of a contact resistance value caused by the fine sliding friction can be suppressed. In addition, the male terminal 12 of the present disclosure structured as just described can also similarly have the functions and effects enjoyable by the aforementioned terminal unit 10.

Modifications

Although the embodiment has been described in detail as a specific example of the present disclosure above, the present disclosure is not limited by this specific description. The present disclosure includes modifications, improvements and the like within a range in which the aim of the present disclosure can be accomplished. For example, the following modifications of the embodiment are also included in the technical scope of the present disclosure.

Figure 6:
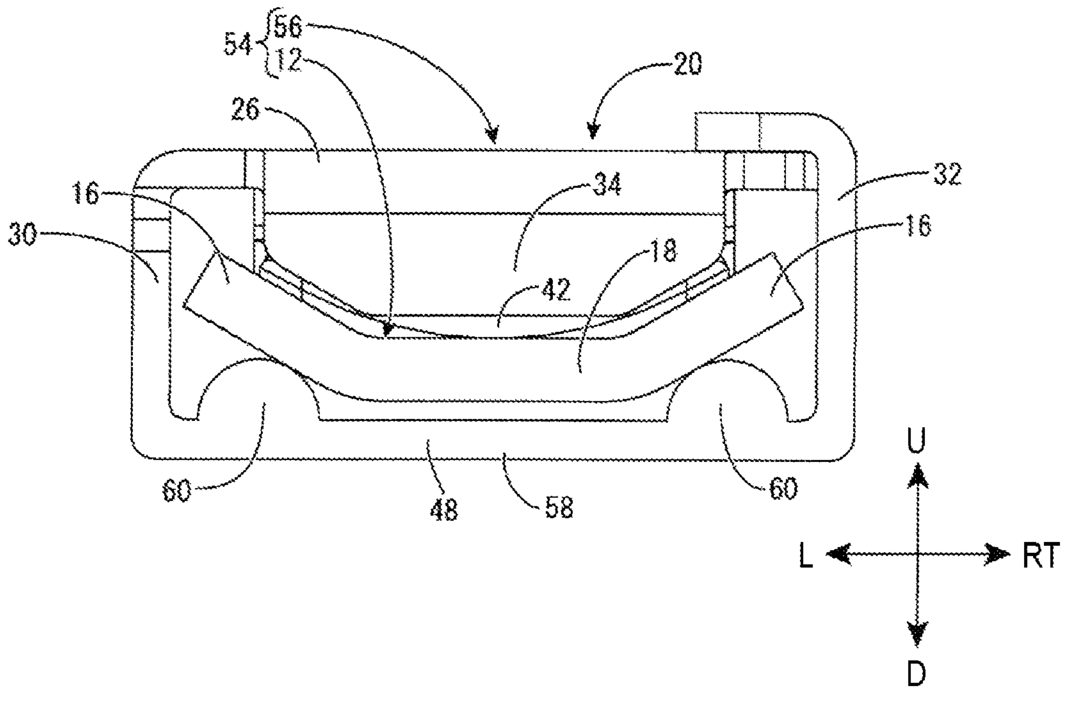
FIG. 6 is an enlarged front view showing a terminal unit according to a modification.

(1) Although the second wall portion 28 of the female terminal 14 includes the pair of side edge parts 44, 44 bent toward the first wall portion 26 in the above embodiment, there is no limitation to this. For example, as in a terminal unit 54 of a modification of the embodiment shown in FIG. 6, a second wall portion 58 of a female terminal 56 may be constituted only by a flat plate portion 48 without including side edge parts 44 formed by being bent. Even in this case, the pair of inclined portions 16, 16 of the male terminal 12 are pressed by first projecting contact point portions 60 provided on side edge parts of the flat plate portion 48, whereby component forces acting inward in the plate width direction are generated in the pair of inclined portions 16, 16 of the male terminal 12. Thus, a force for preventing a displacement of the male terminal 12 can be increased against an external force acting outward in the plate width direction of the male terminal 12 as compared to conventional structures, and a displacement of the male terminal 12 in the plate width direction with respect to the female terminal 56 can be suppressed. Therefore, it is possible to suppress fine sliding friction between the female terminal 56 and the male terminal 12 due to vibration or the like and an increase of a contact resistance value caused by the fine sliding friction.

(2) Although the contact point portion of the female terminal 14 with the upper surface of the male terminal 12 is only one second projecting contact point portion 42 of the resilient contact portion 40 of the female terminal 14 with the flat portion 18 of the male terminal 12 in the above embodiment, there is no limitation to this. A plurality of the second projecting contact point portions 42 may be provided to contact the flat portion 18 or the inclined portions 16.

(3) The shape of the first projecting contact point portion 46, 60 is not limited to the elliptical shape as in the above embodiment or the hemispherical shape as in the modification. The first projecting contact point portion may have, for example, a rectangular parallelepiped shape or cubic shape. In this case, corner parts are preferably chamfered.

(4) Although the male terminal 12 includes the flat portion 18 between the pair of inclined portions 16, 16 in the above embodiment, the flat portion 18 is not essential and the male terminal according to the present disclosure may be shaped such that the inclined portions 16 are coupled in a widthwise center of the male terminal.

(5) Although each first projecting contact point portion 46 continuously extends in the inserting direction of the male terminal 12 into the male terminal insertion gap 38 in the above embodiment, there is no limitation to this. The first projecting contact point portion may not continuously extend in the inserting direction or a plurality of the first projecting contact point portions may be provided while being spaced apart in the inserting direction.

(6) Although the resilient contact portion 40 in the form of a tongue piece is provided to extend from the first wall portion 26 in the above embodiment, the configuration of a resilient contact portion is not limited to this. The resilient contact portion only has to be provided on the first wall portion 26, project toward the second wall portion 28, be resiliently deformable in the direction separating from the second wall portion 28 and bias the male terminal 12 toward the second wall portion 28, and may be, for example, a coil spring, a leaf spring or the like held on the first wall portion 26.

LIST OF REFERENCE NUMERALS

10 terminal unit (embodiment)
12 male terminal
14 female terminal
16 inclined portion
18 flat portion
20 body portion
22 wire connecting portion
26 first wall portion
28 second wall portion
30 side wall
32 side wall
34 protection wall
36 prevention wall
38 male terminal insertion gap
40 resilient contact portion
42 second projecting contact point portion
44 side edge part
46 first projecting contact point portion
48 flat plate portion
50 engaging hole
52 locking portion
54 terminal unit (modification)
56 female terminal
58 second wall portion
60 first projecting contact point portion

What is claimed is:

1. A terminal unit, comprising:

a plate-like male terminal; and a female terminal to be connected to the male terminal, the female terminal including a first wall portion and a second wall portion arranged to face each other across a male terminal insertion gap, the male terminal being inserted into and arranged in the male terminal insertion gap, the male terminal including a flat portion extending in an inserting direction and a pair of inclined portions extending from opposite edges of the flat portion on both sides of the flat portion in a plate width direction, the plate width direction being a direction intersecting the inserting direction into the male terminal insertion gap, the pair of inclined portions being inclined toward one side in a plate thickness direction of the male terminal, the first wall portion including a resilient contact portion facing a surface of the male terminal on the one side in the plate thickness direction and projecting toward the second wall portion, the resilient contact portion being resiliently deformable in a direction separating from the second wall portion to bias the male terminal toward the second wall portion, and the second wall portion including a flat plate portion and a pair of side edge parts, the pair of side edge parts extending obliquely from opposite edges of the flat plate portion toward the first wall portion, the second wall portion further including a pair of first projecting contact point portions provided on the pair of side edge parts, the pair of first projecting contact point portions being configured to respectively contact the pair of inclined portions of the male terminal.

2. The terminal unit of claim 1, wherein:

the male terminal includes a flat portion arranged between the pair of inclined portions in the plate width direction, and the resilient contact portion of the female terminal includes a second projecting contact point portion to be brought into contact with the flat portion of the male terminal.

3. The terminal unit of claim 1, wherein each first projecting contact point portion continuously extends in the inserting direction of the male terminal into the male terminal insertion gap.

4. The terminal unit of claim 1, wherein the second wall portion of the female terminal includes a pair of side edge parts, the pair of first projecting contact point portions projecting on the pair of side edge parts, and the pair of side edge parts are bent toward the first wall portion.

5. The terminal unit of claim 4, wherein:

the male terminal includes a flat portion arranged between the pair of inclined portions in the plate width direction and an angle of inclination of the pair of inclined portions with respect to the flat portion is θ1, the second wall portion of the female terminal includes a flat plate portion arranged between the pair of side edge parts in the plate width direction and an angle of inclination of the pair of side edge parts with respect to the flat plate portion is θ2, and the angle of inclination θ1 is equal to the angle of inclination θ2 or different therefrom within a range of 10°.

6. A female terminal to be connected to a male terminal, the female terminal including a first wall portion and a second wall portion arranged to face each other across a male terminal insertion gap, the male terminal being inserted into and arranged in the male terminal insertion gap, the male terminal including a flat portion extending in an inserting direction and a pair of inclined portions extending from opposite edges of the flat portion on both sides of the flat portion in a plate width direction, the plate width direction being a direction intersecting the inserting direction into the male terminal insertion gap, the pair of inclined portions being inclined toward one side in a plate thickness direction of the male terminal, the first wall portion including a resilient contact portion facing a surface of the male terminal on the one side in the plate thickness direction and projecting toward the second wall portion, the resilient contact portion being resiliently deformable in a direction separating from the second wall portion to bias the male terminal toward the second wall portion, and the second wall portion including a flat plate portion and a pair of side edge parts, the pair of side edge parts extending obliquely from opposite edges of the flat plate portion toward the first wall portion, the second wall portion further including a pair of first projecting contact point portions provided on the pair of side edge parts, the pair of first projecting contact point portions being configured to respectively contact the pair of inclined portions of the male terminal.

7. A terminal unit, comprising:

a plate-like male terminal; and a female terminal to be connected to the male terminal, the female terminal including a first wall portion and a second wall portion arranged to face each other across a male terminal insertion gap, the male terminal being inserted into and arranged in the male terminal insertion gap, the male terminal including a flat portion extending in an inserting direction and a pair of inclined portions extending from opposite edges of the flat portion on both sides of the flat portion in a plate width direction, the plate width direction being a direction intersecting the insertion gap, the pair of inclined portions being inclined toward one side in a plate thickness direction of the male terminal, the first wall portion including a resilient contact portion facing a surface of the male terminal on the one side in the plate thickness direction and projecting toward the second wall portion, the resilient contact portion being resiliently deformable in a direction separating from the second wall portion to bias the male terminal toward the second wall portion, and the second wall portion comprising a flat plate portion, the second wall portion including a pair of first projecting contact point portions provided at side edges of the flat plate portion in the plate width direction, the pair of first projecting contact point portions being configured to respectively contact the pair of inclined portions of the male terminal.

* * * * *